2,931,221
ALTITUDE AND ALTITUDE RATE OF CHANGE METER

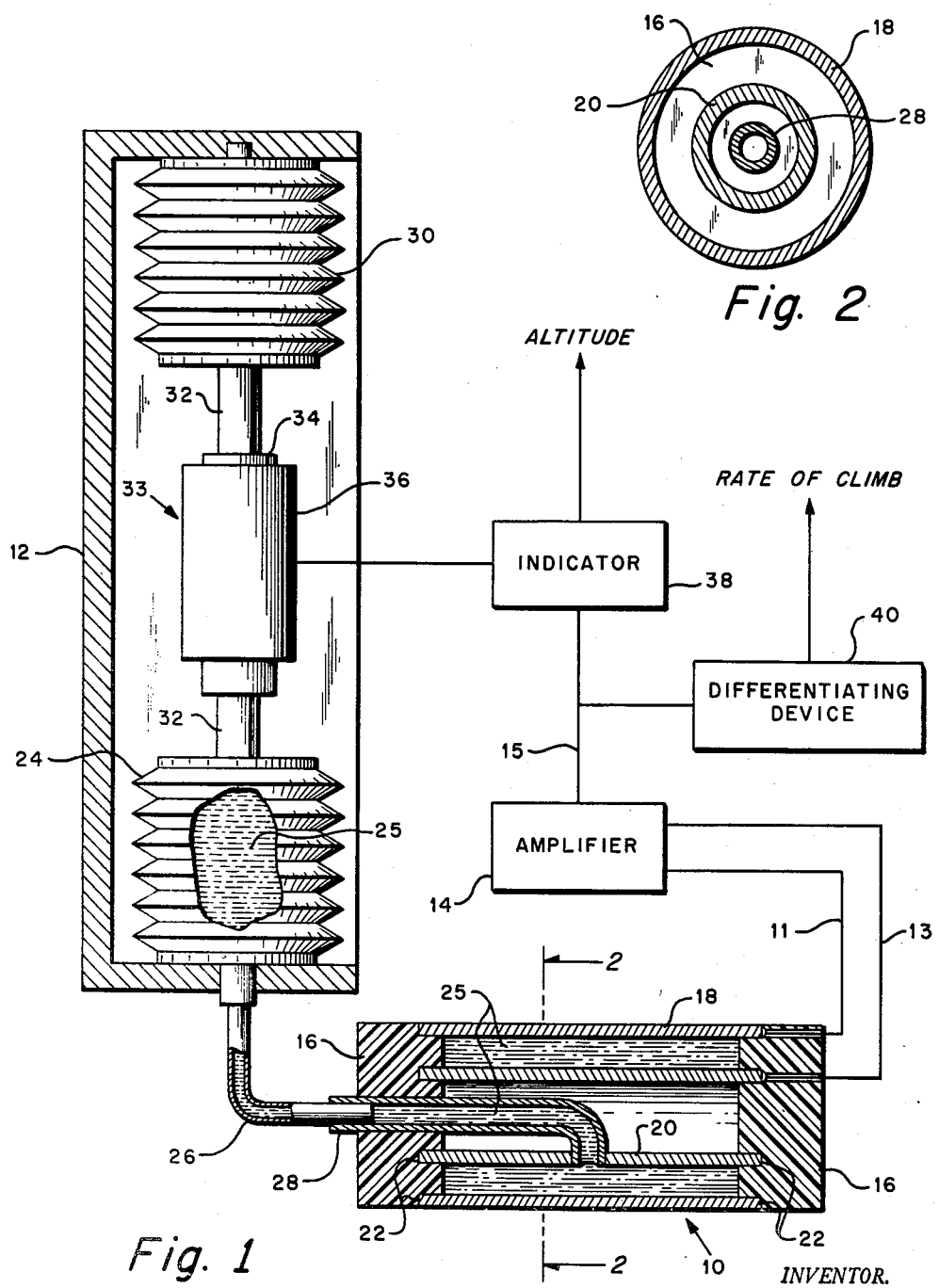

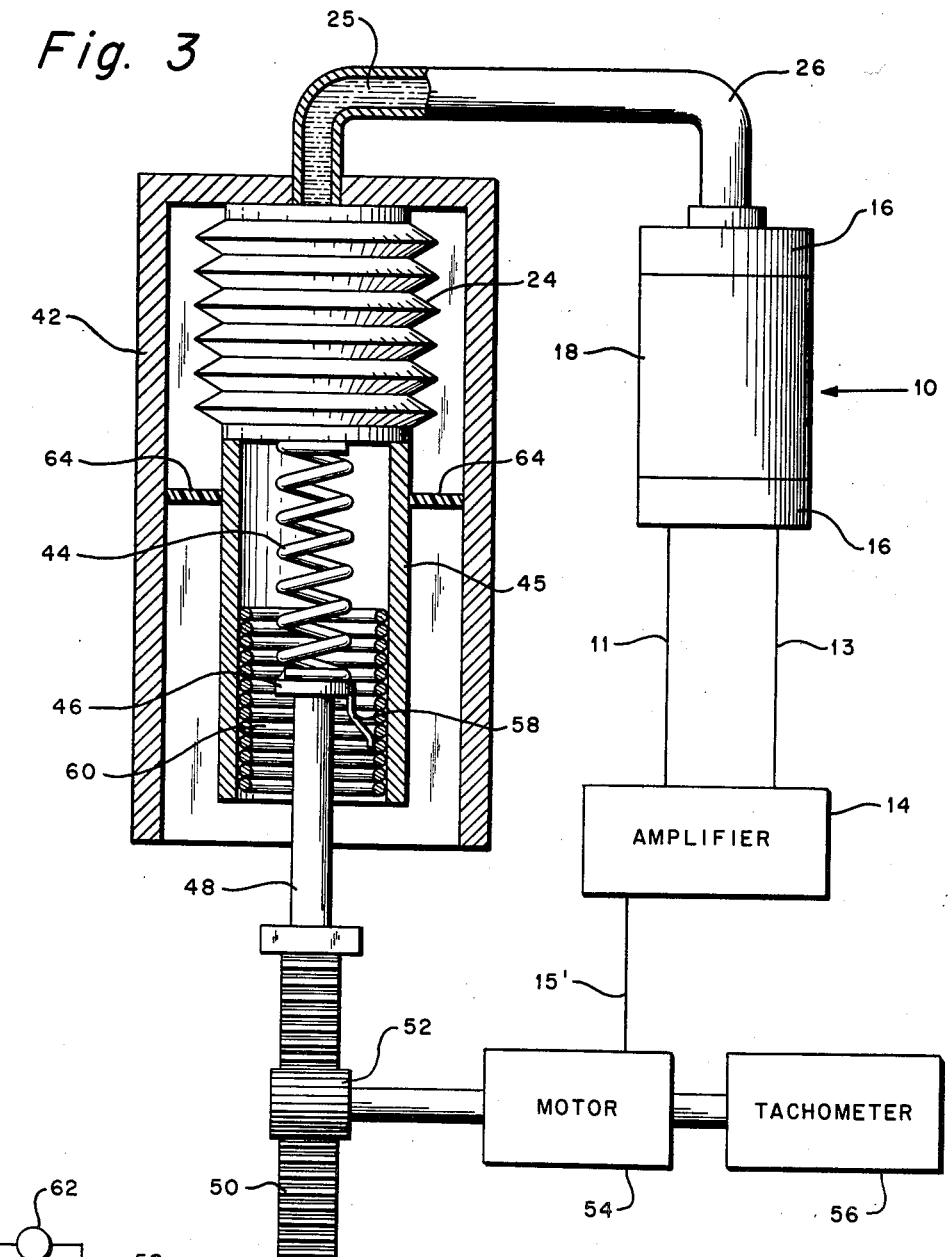

Stanley J. Rusk, Hatboro, Pa.

Application June 24, 1955, Serial No. 517,952

11 Claims. (Cl. 73—179)

(Granted under Title 35, U.S. Code (1952), sec. 266)

The invention described herein may be manufactured and used by or for the Government of the United States of America for governmental purposes without the payment of any royalties thereon or therefor.

The present invention relates to an altitude and altitude rate of change meter and more particularly to a pressure type altimeter in which an electric component is utilized for sensing pressure changes.

Present arrangements employ direct measurement of the strain or displacement of a diaphragm or bellows which is exposed to atmospheric or other unknown pressure on one side and a reference pressure on the other side. The reference pressure may be a vacuum with a spring supported bellows. These arrangements have not proved entirely suitable for the extremely wide operating ranges of altitudes and the speed of operation under which aircraft function today. The large components which are required to obtain the necessary sensitivity over a wide operating range are slow acting and tend to be inaccurate due to the relatively large size and masses of the components involved.

The present device is particularly useful under the conditions set forth above because of its inherent high sensitivity, wide operating range of altitudes, small volume, and reasonable temperature independence. Briefly, one embodiment of the invention comprises a capacitor having one plate as a diaphragm exposed to atmospheric pressure, and the space separating the two plates exposed to the pressure in a bellows. The capacitor modifies a suitable A.C. or varying D.C. signal to an amplifier, the output of which is utilized to move the bellows to change the pressure in the space between the capacitor plates so as to eliminate the signal deviation due to diaphragm distortion. Therefore, the output of the amplifier necessary to accomplish this and to compensate for the changes in altitude indicates directly, by using conventional means, the altitude of the aircraft, and if the signal is fed into a differentiating device of conventional design the rate of climb or the rate of change of altitude will also be indicated thereby. A non-compressible fluid having a flat volumetric characteristic over the operative temperature range is used in the bellows and capacitor with the result that only minute mechanical movement occurs in the system under changing pressure and temperature conditions. The effects of inertia and friction are thereby largely avoided.

The inherent advantages of this arrangement are quite apparent from the above discussion of the device of the present invention. For example, the measuring device is a diaphragm which acts as one plate of the capacitor, and due to the light weight and small size of this diaphragm, the device is quick acting, very accurate, and highly sensitive. It has been noted that there is a minimum of mechanical movement, thereby eliminating to a large extent the effects of friction and inertia in the system. The use of electric components rather than mechanical parts assists in making the whole system respond very quickly to changing conditions.

The first object of the present invention is the provision of an electrical arrangement employing feedback for measuring altitude and altitude rate of change.

Another object is to provide a capacitance device having a plate sensitive to changes in external pressure useful in connection with a device measuring altitude and change of altitude.

A further object of the invention is the provision of an electrical device for measuring changes in pressure employing a capacitor as the sensing element and a bellows unit for providing the feedback.

Still another object is to provide a pressure indicating meter employing a bellows containing a non-compressible fluid and a calibrated spring for measuring the static pressure of said fluid.

A final object of the present invention is the provision of an electrical pressure measuring meter having a sensing head which responds electrically to external pressure changes and which transmits by hydraulic means information of said changes.

Other objects and features of this invention will become apparent to those skilled in the art as the disclosure is made in the following detailed description of the invention as illustrated in the accompanying sheets of drawings in which:

Fig. 1 shows a preferred embodiment of this invention;
Fig. 2 is a view along section 2–2 in Fig. 1;
Fig. 3 shows a second embodiment of the invention; and
Fig. 4 illustrates a simplified diagram of the potentiometer circuit of Fig. 3.

Referring now to the drawings, wherein like reference characters designate like or corresponding parts throughout the several views, there is shown in Fig. 1 the pressure sensing unit 10, bellows housing 12, and amplifier 14. Unit 10 may be cylindrical in shape, as shown in Fig. 2 and constructed of a pair of solid end members 16 supporting two tubular, concentrically arranged condenser plates 18 and 20. Members 16 are made of non-conducting material, such as rubber composition or mica. Cylindrical plates 18 and 20, being the plates of a condenser, are of conducting material and fit into slots 22 in members 16 for support. Inner plate 20 is rigid and inflexible while outer plate 18 is designed to be flexible and subject to bending in accordance with a difference in pressure acting on opposite faces thereof. Housing 12 supports a bellows 24 mounted on one end face of casing 12 and open through flexible pipe 26 and tube 28 to the annular space separating plates 18 and 20. Flexible pipe 26 permits sensing unit 10 to be orientated as in a swiveling probe to avoid the effects of a slipstream against outer plate 18. Within bellows 24 connected to sensing unit 10 is entrapped a non-compressible fluid 25 which is not subject to measurable volumetric changes over the temperature range contemplated for the use of this equipment. An example of this type of fluid would be a liquid silicone compound having dielectric qualities suitable for use in a condenser. Within casing 12 is also mounted a second bellows 30 which is evacuated. The movable or free end faces of bellows 24 and 30 are rigidly linked together by a rod 32 having mounted thereon an iron core 34 which passes through and forms a solenoid assembly 33 with coil 36.

Sensing unit 10 is connected by leads 11 and 13 as a capacitance to the input of amplifier 14, the output of which varies in accordance with changes in capacitance of unit 10. Amplifier 14 is of conventional design producing either an error signal or a voltage modified by the action of sensing unit 10. The details of amplifier 14 are not illustrated, but any suitable device may be used as well known to those skilled in the art. The output of amplifier 14 is delivered by lead 15 through a low impedance indicating device 38 to solenoid coil 36, for reasons explained further below. Indicator device 38 may give directly a pressure reading or may translate the pressure readings into altitude readings, as is well understood in the art. A high impedance differentiating device 40 of conventional design may give the rate of change of pressure or altitude.

Operation of the device of Fig. 1 is explained as follows:

A slight decrease in atmospheric pressure acting against the outside of plate 18 of unit 10 will cause plate 18 to bulge outwardly to a very slight degree causing a change in the capacitance of the condenser formed by plates 18 and 20, and causing ultimately a slight change in the output of amplifier 14. Force coil 36 of solenoid 33 is energized in accordance with the output of amplifier 14. The slight change in this output caused by the change in pressure noted above causes, in this case, an increase in the energization of coil 36. Core 34 is thereby subject to an increase in force, tending to draw it into the center of coil 36, upwards in this situation, resulting in a decrease in the pressure of fluid 25 trapped within bellows 24, thus tending to return diaphragm 18 to return to its normal, undistorted shape. Due to the extremely sensitive nature of the capacitor in unit 10, slight displacements of diaphragm 18 are instantly detected and the electromechanical feedback arrangement described above produces the pressure increment in fluid 25 to rebalance diaphragm 18. Fluid 25 contributes to the speed of operation by being incompressible. It should be noted that the physical movements of bellows 24 and core 34 are so slight as to be visually not noticeable. Evacuated bellows 30 has been provided, as is well understood in the art, to permit the pressure indications to be made in absolute values.

The arrangement of Fig. 3 is similar to that of Fig. 1 except that the solenoid assembly is eliminated and a mechanical unit substituted therefor. A casing 42 with bellows 24 mounted therein is provided. Bellows 24, conduit 26, and sensing unit 10 may be identical to the arrangement shown in the embodiment illustrated in Fig. 1, including the incompressible fluid 25. Against the movable face of bellows 24 is attached one end of a calibrated spring 44, the other end of which is connected to a plate 46 secured to a rod 48. The latter is linked to a rack 50 of a rack and pinion mechanism. Pinion 52 of this mechanism is connected to a servo motor 54 which is driven by the output of amplifier 14, as explained in connection with the description of Fig. 1. A cylinder 45 is also mounted on the movable face of bellows 24 and encloses spring 44. Tachometer 56 indicates the instantaneous velocity of motor 54 and thus functions as a differentiating device in a manner analogous to differentiating device 40. Plate 46 is provided with a contact prong 58 for contacting a potentiometer coil 60 which is mounted within cylinder 45. As illustrated in Fig. 4, this arrangement permits meter 62 to indicate the position of prong 58 on coil 60 if a constant voltage V is applied. As will be explained below, the position of prong 58 on coil 60 indicates the rebalance force applied to maintain diaphragm 18 in its undistorted position and thereby the external pressure acting on sensing unit 10. Thus, the voltage picked off potentiometer 60 by meter 62 indicates this pressure, and if potentiometer 60 is designed to be non-linear, it may permit meter 62 to read directly the altitude of the craft carrying the device of the present invention. A resilient, annularly shaped membrane 64 of elastic material, such as rubber or plastic, bridges outer casing 42 and cylinder 45. The chamber thus formed enclosing bellows 24 is evacuated, permitting pressure readings to be in absolute values.

In operation of this arrangement, the amplifier output is delivered to motor 54 which rebalances the pressure within sensing unit 10 through rack 50 and pinion 52, calibrated spring 44, and bellows 24, for reasons already explained. The position of prong 58, shown by the reading of meter 62, depends upon the state of compression of calibrated spring 44. This, of course, indicates the pressure of fluid 25 in bellows 24 necessary to rebalance diaphragm 18 of sensing unit 10 because spring 44 transmits the force from rack 50 to the free face of bellows 24 enclosing fluid 25. Except for the different type of feedback arrangement used, the species of Fig. 3 functions in the same manner as that of Fig. 1 to indicate the external pressure acting on unit 10.

Of course, it is understood that various changes which are obvious to those skilled in the art may be made. For example, the embodiments described are designed to operate over ranges of atmospheric pressure and below. By slight modification, higher pressures may easily be measured.

The advantages of this inventive device over other altimeter devices have already been described. It should be noted that an additional feature of the device of the present invention is its adaptability for use as a remotely operated pressure recorder. The output of amplifier 14, being in electrical form, can easily be converted to a radio wave capable of transmission over great distances, or be made to operate a permanent recording device such as a facsimile equipment.

Since certain changes may be made without departing from the spirit and scope thereof, it is intended that all matters contained in the foregoing description and shown in the accompanying drawings shall be interpreted as illustrative and not in a limited sense.

What is claimed is:

1. An arrangement for detecting changes in an ambient pressure comprising, in combination, a detector element subject externally to said ambient pressure and internally to an opposing balancing pressure, means coupled to said detector element operable to provide an electrical signal indicating changes in said external pressure with respect to internal pressure, said detector element comprising an expandable capacitive unit containing an incompressible fluid under said internal pressure, and feedback means responsive to said electrical signal for adjusting said internal pressure in the direction of canceling said pressure difference.

2. Apparatus for determining external pressure comprising in combination condenser means formed by a stationary plate and a pressure responsive diaphragm separated by a trapped incompressible fluid, said diaphragm being subject to distortion by the pressure difference between said external pressure and the pressure of said trapped fluid, means for producing an electrical signal which varies in accordance with the change in capacitance due to distortion of said diaphragm, feedback means for varying the pressure of said trapped fluid in accordance with said electrical signal tending to eliminate said distortion of said diaphragm, and means responsive to said electrical signal for indicating said external pressure.

3. Apparatus for determining external pressure comprising in combination condenser means formed by a stationary plate and a pressure responsive diaphragm separated by a trapped incompressible fluid, said diaphragm being subject to distortion by the pressure difference between said external pressure and the pressure of said trapped fluid, means for producing an electrical signal which varies in accordance with the change in capacitance due to distortion of said diaphragm, and feedback means including a solenoid and a bellows exposed to the interior of said condenser means for varying the pressure of said trapped fluid in accordance with said electrical signal tending to eliminate said distortion of said diaphragm, and means responsive to said electrical signal for indicating said external pressure.

4. Apparatus for determining external pressure comprising in combination condenser means formed by a stationary plate and a pressure responsive diaphragm separated by a trapped incompressible fluid, said diaphragm being subject to distortion by the pressure difference between said external pressure and the pressure of said trapped fluid, means for producing an electrical signal which varies in accordance with the change in capacitance due to distortion of said diaphragm, and feedback means including a calibrated spring and a bellows exposed to the interior of said condenser means for varying the pressure of said trapped fluid in accordance with said electrical signal tending to eliminate said distortion of said diaphragm, and means responsive to said electrical signal for indicating said external pressure.

5. In an altimeter, the combination comprising a capacitance having at least one diaphragm sensitive to changes in atmospheric pressure as a plate thereof, amplifier means, means to supply an input signal to said amplifier means passing through said capacitance means and modified thereby in accordance with movement of said diaphragm caused by atmospheric pressure changes, a bellows containing a trapped fluid and communicating with the interior of said capacitance, means to convert the output signal of said amplifier means to a force supplied to once face of said bellows tending to adjust the pressure within to balance the force of atmospheric pressure pressing against the outer face of said diaphragm, an altitude indicating means connected to the output of said amplifier to indicate the altitude of said capacitance.

6. An arrangement for detecting changes in an ambient pressure comprising, in combination, a detector element subject externally to said ambient pressure and internally to an opposing balancing pressure, said detector element provided with means to alter an electrical signal to a degree indicating changes in said external pressure with respect to said internal pressure, said latter named means comprising an expandable capacitive unit containing an incompressible fluid under said internal pressure, and feedback means responsive to said electrical signal for adjusting said internal pressure in the direction of canceling said pressure difference, said feedback means including a sealed bellows having a stationary end wall and a movable end wall, means connecting the interior of said bellows with the interior of said capacitive unit for containing together a predetermined volume of said incompressible fluid, and further means included in said feedback means for acting on said movable wall.

7. The combination of claim 1 wherein there is further provided differentiating means coupled to be energized by said electrical signal, and indicating means coupled to said differentiating means to indicate the rate of change of said external pressure.

8. The combination of claim 2 wherein there is further provided differentiating means coupled to be energized by said electrical signal, and indicating means coupled to said differentiating means to indicate the rate of change of said external pressure.

9. The combination of claim 3 wherein there is further provided differentiating means coupled to be energized by said electrical signal, and indicating means coupled to said differentiating means to indicate the rate of change of said external pressure.

10. The combination of claim 4 wherein there is further provided differentiating means coupled to be energized by said electrical signal, and indicating means coupled to said differentiating means to indicate the rate of change of said external pressure.

11. The combination of claim 5 wherein there is further provided a differentiating means coupled to be energized by said output signal, and indicating means coupled to said differentiating means to indicate the rate of change of altitude.

References Cited in the file of this patent

UNITED STATES PATENTS

| | | |
|---|---|---|
| 2,042,490 | Zahl | June 2, 1936 |
| 2,388,542 | Hobbs | Nov. 6, 1945 |
| 2,571,863 | Godsey | Oct. 16, 1951 |
| 2,618,157 | Keeling | Nov. 18, 1952 |
| 2,639,615 | Clewell | May 26, 1953 |
| 2,646,682 | Ovtschinnikoff | July 28, 1953 |
| 2,685,200 | Slottow | Aug. 3, 1954 |
| 2,713,266 | Smith | July 19, 1955 |
| 2,775,123 | Salle | Dec. 25, 1956 |

FOREIGN PATENTS

| | | |
|---|---|---|
| 1,060,728 | France | Nov. 18, 1953 |